Dec. 23, 1969   R. F. CHANDLER, JR   3,486,009
VEHICLE LOGGING SYSTEM

Filed Dec. 1, 1966   11 Sheets-Sheet 1

INVENTOR.
ROBERT F. CHANDLER JR.

BY *J. T. Comfort*

HIS ATTORNEY

Dec. 23, 1969   R. F. CHANDLER, JR   3,486,009
VEHICLE LOGGING SYSTEM

Filed Dec. 1, 1966   11 Sheets-Sheet 2

Dec. 23, 1969  R. F. CHANDLER, JR  3,486,009
VEHICLE LOGGING SYSTEM
Filed Dec. 1, 1966  11 Sheets-Sheet 3
AND GATE
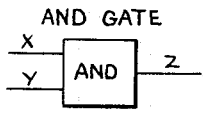
FIG. 7A
OR GATE
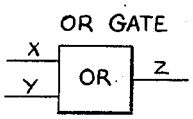
FIG. 7B
FLIP FLOP
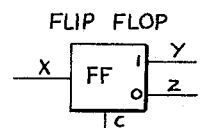
FIG. 7C
SINGLE SHOT
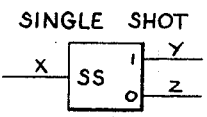
FIG. 7D
TIME DELAY
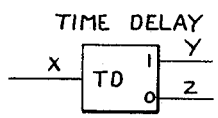
FIG. 7E
INVERTER
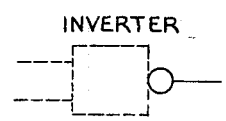
FIG. 7F
BINARY COUNTER
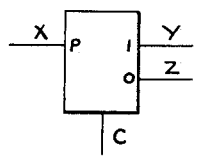
FIG. 7G
SHIFT REGISTER
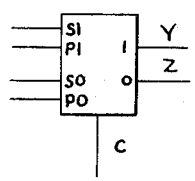
FIG. 7H
CABLE
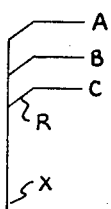
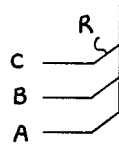
FIG. 7I
FIG. 7

Dec. 23, 1969   R. F. CHANDLER, JR   3,486,009
VEHICLE LOGGING SYSTEM
Filed Dec. 1, 1966   11 Sheets-Sheet 5

Dec. 23, 1969   R. F. CHANDLER, JR   3,486,009
VEHICLE LOGGING SYSTEM
Filed Dec. 1, 1966   11 Sheets-Sheet 8

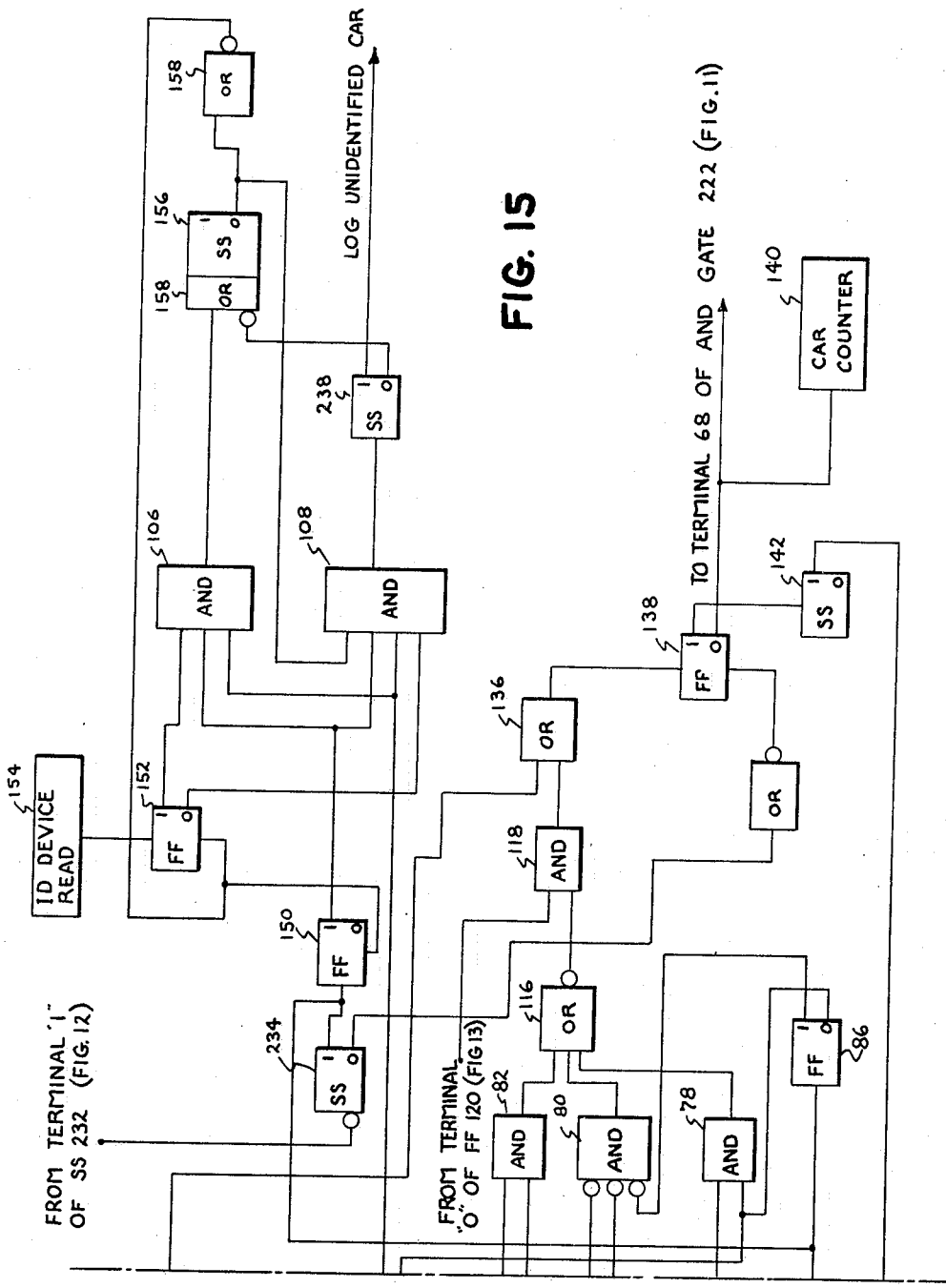

United States Patent Office 3,486,009
Patented Dec. 23, 1969

3,486,009
VEHICLE LOGGING SYSTEM
Robert F. Chandler, Jr., Roanoke, Va., assignor to General
Electric Company, a corporation of New York
Filed Dec. 1, 1966, Ser. No. 598,357
Int. Cl. G06f 7/38; G06g 7/00
U.S. Cl. 235—92                                    12 Claims

ABSTRACT OF THE DISCLOSURE

A vehicle logging system for counting railroad cars and for logging cars lacking an identification device. In the intervals between electrical pulses developed by a trackside wheel sensor, a first counter counts up at a first rate while a second counter simultaneously counts down at a second and somewhat lesser rate. When each electrical pulse occurs, the second counter is cleared, the count previously established in the first counter is transferred to the second counter, and the first counter is cleared. When the second counter counts down to 1 and a logging enabling signal is present, as occurs only at the middle area of a car, a logging signal is generated which actuates determination circuitry. A determination of whether the car carried an identification device is made three electrical pulses later by logic circuitry. The logging enabling circuits are logic circuits which remember the number of wheels on a previous car and generate the enabling signal, which also drives a car counter, to avoid the generation of a logging signal between cars.

BACKGROUND OF INVENTION

In the railroad industry at present, railroad cars are identified visually through the use of printed information placed on the side of each car giving the serial number and the name of the owning railroad. Because of the magnitude of railroad operations in this country, the inter-company car borrowing that is common, and the frequency with which a railroad car is shifted from one train to another, it has become a major and almost overwhelming bookkeeping task for railroad companies to keep track of their cars. Each company may want to keep track of its own cars for purposes of maintenance, but may also want to know the location of each of its competitor's cars being used by it since the company must pay a daily surcharge while it has possession of such a car. By knowing where the competitor's cars, are, the borrowing company can facilitate their return to the competitor.

It has been recognized that some means of automatically identifying each railroad car is highly desirable and several systems have been proposed for accomplishing this automatic identification. In one system, each car carries a signal repeating device including a plurality of piezoelectric elements having different resonant frequencies. The signal repeating device is interrogated by trackside equipment which decodes the repeated signal to provide the car number and the number of the owing railroad. In another system, light-reflective tape is arranged in a coded configuration on the side of the railroad car. A photoelectric cell detects the configuration of the tape and generates car identifying signals.

While these systems automatically identify and count all cars having an identification device, they do not detect or count a car lacking such a device. For this reason, the systems cannot provide an accurate count of the number of cars in a train, information which may be necessary to the railroad if they are to assign or transfer cars to different locations to meet daily changing requirements.

Attempts have been made to count cars by sensing the number of sets of wheels in a passing train and dividing the total by four. The term wheel-set as used here refers to the pair of wheels mounted on a single axle. Thus, a four wheel-set car has 8 wheels and 4 axles. This method is unsuitable for general use, however, since it works correctly only where every car in the train has four sets of wheels. Many common cars, such as passenger cars, have six sets of wheels and special types of cars may have up to sixteen sets of wheels. Apart from the number of wheels, cars used on American railroads also differ in several other respects which increase the difficulty of accurate car counting. Cars may range in length from a minimum of 24 feet to a maximum of 110 feet and may be coupled to one another at between-car distances of 6 to 16 or more feet. Any completely satisfactory vehicles logging system must not only be able to function without error in spite of these variations, but must also be able to detect and log both the first and the last cars of any train.

SUMMARY OF INVENTION

To meet these requirements and to overcome the deficiencies of the known prior art systems, the present invention contemplates the use of a vehicle logging system which is adapted to receive an electrical signal from a trackside wheel sensor whenever a vehicle wheel passes by the sensor. The logging system includes first and second counters along with a first pulse circuit for establishing a count in the first counter at a predetermined rate during the intervals between the electric signals. A second pulse circuit connected to the second counter causes a reduction in magnitude of a previously established count in the second counter during the intervals between electrical signals. The two counters function independently of one another except when an electrical signal is received by a sequencing circuit within the logging system. This sequencing circuit responds to the electrical signals to perform the following functions in sequence; to reset the second counter, to transfer the count in the first counter to the second counter, and to reset the first counter. Since a count in the second counter is reduced more slowly than a count is accumulated in the first counter, the second counter reaches a predetermined minimum magnitude only when the spacing between the vehicle wheels is greater than normal, a condition occurring usually only at the middle area of each railroad car. A logging enabling circuit connected to the wheel sensor produces an enabling signal after it has received a predetermined number of electrical signals, determined by the number of wheelsets on the preceding car. The simultaneous occurrence of the predetermined minimum magnitude of count in the second counter and of the enabling signal causes a vehicle logging signal to be generated in an output circuit in the logging system.

DESCRIPTION OF DRAWINGS

While the specification concludes with claims particularly pointing out and distinctly claiming that which is regarded as the present invention, the details of the invention along with its further objects and advantages may be more readily ascertained from the following detailed description in which:

FIGURE 2 indicates the manner in which FIGURES 11-15 are to be connected to form a complete logic diagram of one embodiment of a vehicle logging system built in accordance with the present invention;

FIGURE 3 shows the manner in which

FIGURE 7 shows the more common logic elements used in the detailed logic diagrams;

FIGURES 8 and 9 are the upper and lower halves respectively, of a block diagram of a vehicle logging system constructed in accordance with the present invention;

FIGURES 11-15 are segments of a detailed logic diagram of a vehicle logging system constructed in accordance with the present invention.

ENVIRONMENT OF INVENTION

Figure 1:
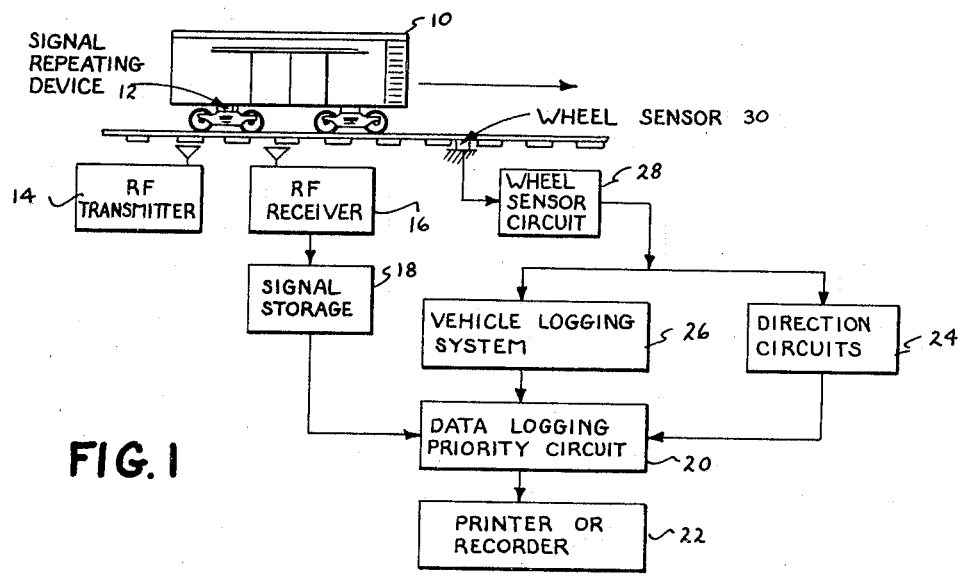
FIGURE 1 is a block diagram showing the components of a complete vehicle identification and logging system, including the vehicle logging system of the present invention.
Figure 2:
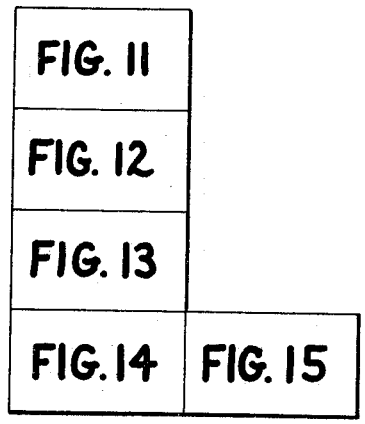
Figure 3:
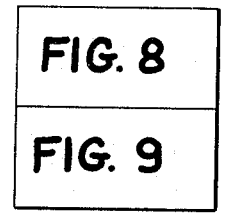

Referring now to FIGURE 1, a railroad car 10 to be counted may carry an identification device such as a signal repeating device 12 mounted on the car between the sets of wheels at one end of the car. The identification device may be mounted at either end of the car but must be located within three sets of wheels from the middle area of the car for reasons set out below. As the car 10 passes a radio frequency (RF) transmitter 14 located at trackside, the identification device 12 responds to repeat certain frequencies in a sweep frequency signal emitted by the transmitter 14. The repeated frequencies are received by a trackside RF receiver 16, are decoded and stored in a signal storage circuit 18, and are applied to a data logging priority circuit 20 which causes the signals to be transmitted to a printer or recorder 22 according to a predetermined priority schedule.

The data logging priority circuit 20 also receives signals from train direction circuits 24 and from a vehicle logging system 26 built in accordance with the concepts of the present invention. Both the direction circuits 24 and the vehicle logging system 26 receive electrical signals or wheel pulses from a wheel sensor circuit 28 electrically connected to trackside wheel sensors such as sensor 30. The direction circuits 24 include two such wheel sensors spaced along the railroad track. The first sensor to detect a car wheel indicates the direction in which the train is traveling, inhibits the second sensor, and produces a signal for eventual printing or recording by the circuit 22. The present invention relates only to the vehicle logging system 26, and there is no detailed description of any of the other circuits or elements in FIGURE 1.

Figure 4:
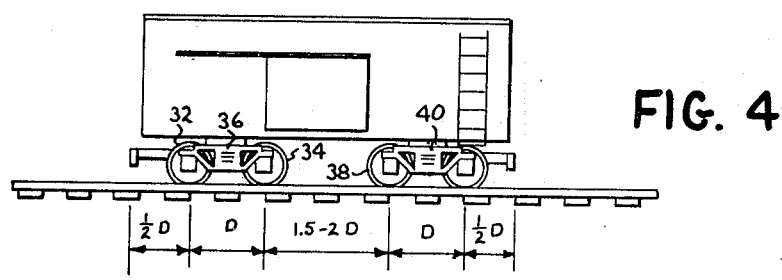
FIGURES 4-6 show various types of railroad cars which may be logged by a vehicle logging system constructed in accordance with the present invention.
Figure 5:
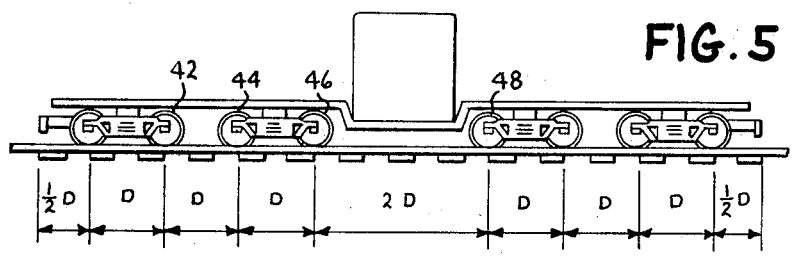

As was pointed out above, railroad cars vary greatly both in length and in the number of sets of wheels per car so that any system based on car length or on a uniform number of sets of wheels is unsatisfactory for general use. To determine if a common characteristic exists among the many types of railroad cars, the dimensions of many types of cars were studied and compared. It was found that regardless of the length of a car or the number of sets of wheels on a car, the spacing between sets of wheels at each end of a car ranges from 5 to 6 feet while the spacing between sets of wheels on either side of the middle area of a car is at least 1½ times as much. For instance, in FIGURE 4 the spacing between the wheels 32 and 34 on the truck 36 is a distance D whereas the spacing between the inner wheel 34 an the truck 36 and the inner wheel 38 on the truck 40 is at least (1.5-2)D. Moreover, the distance between the outer wheel of a car and its coupling point is approximately ½D so that the spacing between adjacent sets of wheels on coupled cars also equals D. These wheel spacing dimensions are common to all cars, with a below-noted exception, including the uncommon types such as the drop center flatcar shown in FIGURE 5. The distance between adjacent wheels mounted on separate trucks, such as wheels 42 and 44 on such cars also equals D except where the wheels are at either side of the middle area of the car. For example, the spacing between the wheels 46 and 48 on the drop center flatcar is at least 2D, rather than D.

Figure 6:
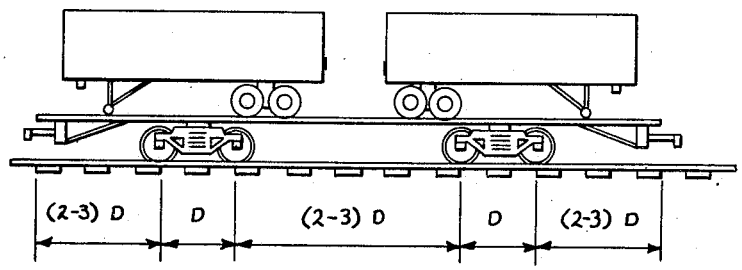

The one type of railroad car in common use which does not have these wheel spacing dimensions is a trailer train car such as that shown in FIGURE 6. While such a car has the normal spacing (D) between wheels on the same truck and between wheels on either side of the middle area of the car, the outermost wheels at each end of a trailer train car are spaced a distance of (2-3)D from the coupling point of the car. This particular wheel spacing arrangement is made necessary by the unusual length of such cars and by the need for support for the central part of the car.

Vehicles logging systems constructed in accordance with the concepts of the present invention utilize the facts that the distance between wheels at the middle area of a railroad car is at least 1½ times the distance between wheels at either end of the car, that no American railroad car has less than four sets of wheels, and that all railroad cars have the same number of wheels at either end. The system to be described below first senses the middle area of a car and then provides a logging signal which permits a determination of whether or not the car carried any identification device. If not, the system generates a signal which results in an unidentified car being logged by the printer or recorder circuits 22. Enabling circuitry, described below, prevents a false middle area of the car determination from occurring at the ends of a trailer train car.

SYMBOLS AND NOMENCLATURE

In the following detailed description, the term "one signal" is used to refer to a signal having a predetermined voltage, whereas the term "zero signal" actually refers to a lack of a signal voltage. The symbols shown in FIGURES 7a through 7h are the more common logic elements used in the diagrams of FIGURES 8 and 9 and of FIGURES 11-15. In all of the elements shown, input terminals are usually at the left side or at the top of the symbols whereas output terminals are usually at the right side of the symbols. Where a terminal is connected at the bottom of a symbol, it is generally a resetting or clearing terminal. The application of a one signal to a clearing terminal drives the element into its reset condition.

AND gate

FIGURE 7a shows an AND gate, one type of gating means, having a pair of input terminals X and Y and a single output terminal Z. If one signals are applied to all of the input terminals simultaneously, a one signal appears at the output terminal. If a zero signal is applied to any of the input terminals, the AND gate is said to be inhibited and a zero signal appears at the output terminal.

OR gate

FIGURE 7b shows an OR gate, also a gating means, having input terminals X and Y and a single output terminal Z. If a one signal is applied to any of the input terminals, a one signal appears at the output terminal. If zero signals are applied to all of the input terminals, a zero signal appears at the output terminal.

Flip-flop

FIGURE 7c shows a flip-flop which is a bistable device having an input terminal X, a clearing terminal C, and a pair of output terminals Y and Z. The flip-flop is shown in its reset state wherein a one signal appears at the output terminal Y, the "1" terminal, and a zero signal appears at the output terminal Z, the "0" terminal. If a one signal is applied at the input terminal X, the output at terminal Y goes to zero while the output at terminal Z goes to one. The flip-flop remains set until a one signal is applied to the clearing terminal C, at which time the flip-flop resumes its reset condition.

Single shot

FIGURE 7d shows a single shot, which is a monostable device having a single input terminal X and a pair of output terminals Y and Z. When a one signal is applied to the input terminal, the output at terminal Y goes to one whereas the output at terminal Z goes to zero for a predetermined period of time. At the end of this time, the single shot automatically resumes its reset condition.

Time delay element

FIGURE 7e shows a time delay element having an input terminal X and a pair of output terminals Y and Z. When a one signal is applied to the terminal X of the time delay element, a one signal appears at the terminal Y after a predetermined time and a zero signal appears at the terminal Z unless a second one signal is applied. If the second one signal is applied before the predetermined time has elapsed, the time delay element remains in its reset condition with the Y terminal having a zero signal and the Z terminal having a one signal. Where only one output terminal is shown, it may be assumed that this is the "one" terminal. The predetermined time is normally listed. If no time is listed, it may be assumed that there is no possibility that a subsequent one signal could be applied to the time delay element within the predetermined time.

Inverter

FIGURE 7f shows an inverter symbol, a small circle which may appear at any of the input or output terminals of a logic element. The inverter changes the state of any signal applied to it. For instance, if a one signal is applied to the left side of the inverter shown in FIGURE 7f, a zero signal is produced at the right side. Conversely, where a zero signal appears at the left side of the inverter, a one signal appears at the right side.

Binary counter element

FIGURE 7g shows a binary counter element having a pulse input terminal X, a clearing terminal C, and a pair of output terminals Y and Z. If a one signal is applied at the input terminal X while the clearing terminal C is held at a zero signal level, the signal on the "1" terminal Y goes to one and the signal on the "0" terminal Z goes to zero. The counter element remains in this condition until a one signal is applied to the clearing terminal C or until another one signal is applied to the input terminal X. On either of these occurrences, the counter element resumes its reset condition, in which a zero signal appears at the "1" terminal and a one signal appears at the "0" terminal.

Shift register element

FIGURE 7h shows a shift register element which is similar to a binary counter element except that the shift register includes S1 (steer 1) and S0 (steer 0) input terminals along with P1 (pulse 1) and P0 (pulse 0) input terminals. The shift register includes a pair of output terminals Y and Z and a clearing terminal C. If both S1 and S0 both have a zero signal applied to them, the shift register will respond to a pulse to change states in the same manner as the binary counter. If the P1 input terminal is held at one and the P0 input terminal is held at zero, the shift register can change only to its set condition wherein the Y terminal has a one signal and the Z terminal a zero signal. Conversely, if the P1 terminal is held at zero and the P0 terminal is held at one, the shift register can change only to its reset condition wherein the Y terminal has a zero signal and the Z terminal a one signal. If the P1 and P0 terminals are tied together, the shift register can change between its set and reset conditions when a pulse is received.

Cabling

FIGURE 7i shows a drafting practice intended to eliminate multiple wires here possible. Three individually insulated wires A, B, and C are shown at the upper and lower ends of a single trunk line X. Where this symbol is used, each wire is identified at some point before it enters the trunk line and at some point after it leaves the trunk line. Cabling can be distinguished from conventional wiring connections by the slanted junctions R between the individual wires and the trunk line X.

FUNCTIONAL DIAGRAM

Figure 8:
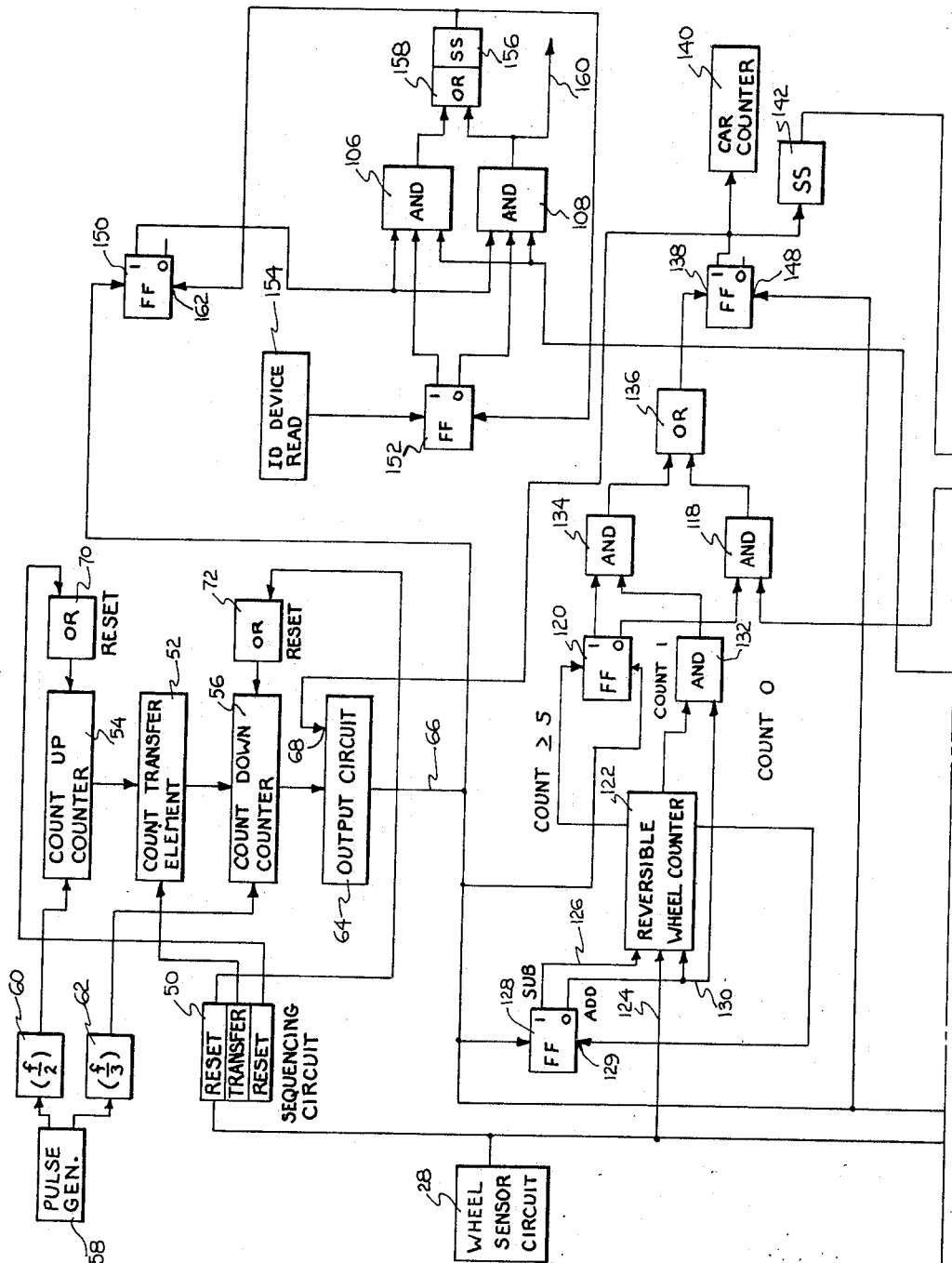
FIGURES 8 and 9 are to be connected to form a functional diagram of one embodiment of a vehicle logging system built in accordance with the present invention.
Figure 9:
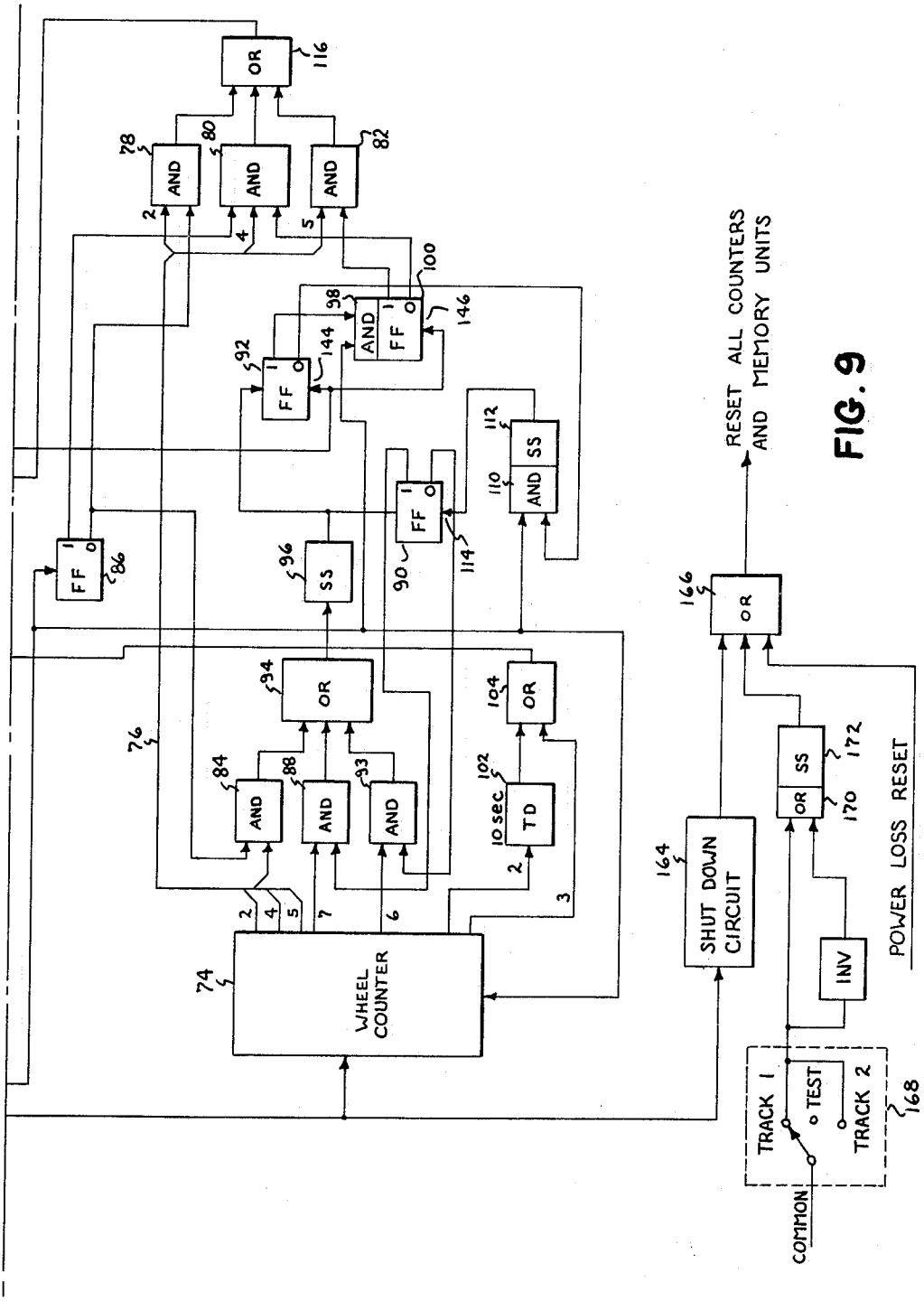

FIGURES 8 and 9 are the upper and lower halves respectively of a functional diagram which may be used in conjunction with the following description to gain an understanding of the manner of operation of the system. Detailed logic circuits are included only where necessary to allow an understanding of the invention.

Pulse counter circuits

The pulse counter circuits are shown at the upper part of FIGURE 8 and include a first or countup counter 54, a second or countdown counter 56, a count transfer element 52 interconnecting the counters 54 and 56, an output circuit 64 having a first input from the countdown counter 56 and a second enabling input 68 from the logging enabling circuits for the vehicle logging system. The pulse counter circuits also include a first pulse circuit having a pulse generator 58 which produces pulses at the rate of 2000 pulses per second, and a frequency divider 60 which halves the pulse rate before causing the pulses to be applied to the countup counter 54. A second pulse circuit includes the pulse generator 58 and a frequency divider 62 which cuts the rate of the generated pulses in third before applying the pulses to the countdown counter 56. The operation of the counters is controlled by a sequencing circuit 50 having an input from a wheel sensor circuit 28 and having outputs to the counter 54, the counter 56, and the count transfer element 52. Each time a railroad car wheel pulse which is applied to the sequencing circuit 50, the sequencing circuit 50 provides a signal for resetting the countdown counter 56 through an OR gate 72, a signal to the count transfer element 52 to cause the count previously established in the countup counter 54 to be transferred to the countdown counter 56, and signal for resetting the countup counter 54 through an OR gate 70. In a preferred embodiment of the invention, counts are accumulated in the countup counter 54 at the rate of 1000 pulses per second at the same time any count in the countdown counter 56 declines at a rate of 667 pulses per second.

The magnitude of the count established in the countup counter 54 prior to its being reset by the sequencing circuit 50 is a function of the time interval between wheel pulses. In turn, the time interval is a function of wheel spacing and train speed. If the time interval between pulses generated by the wheel sensor circuit 28 is exactly one second, a count of 1000 accumulates in the countup counter 54. When this count of 1000 is transferred to the countdown counter 56, the count begins to decline at a rate of 667 pulses per second. The countdown counter 56 will reach its minimum magnitude in 1.5 seconds if it is not reset before that time by the sequencing circuit 50 upon the generation of another wheel pulse. By locating the wheel sensors outside any railroad switching yards, acceleration and deceleration of the train are minimized and can be ignored. Since the only significant variable affecting the magnitude of the count accumulated in the countup counter 54 is the wheel spacing, the count in the countdown counter 56 reaches its minimum magnitude, a count of 1, only when the spacing between wheels is at least one and a half times normal wheel spacing. As was brought out above, this normally occurs only at the middle area of a railroad car although it may occur at the ends of trailer train cars. If a logging enabling signal is present at the enabling input 68 of the output circuit 64 when this count of 1 exists, a logging signal is generated and appears on the output terminal 66. If the railroad car in process of being logged has less than ten sets of wheels, a regular logging enabling circuit generates the logging enabling signal for the next car. However, if the car being logged has ten or more sets of wheels, an auxiliary logging enabling circuit inhibits the regular enabling circuit and generates the logging enabling circuit for the next car.

Regular logging enabling circuit

The regular logging enabling circuit is driven by wheel pulses generated by the wheel sensor circuit 28 and applied to a binary-to-decimal converting wheel counter 74 shown in FIGURE 9. The wheel counter 74 has a plurality of output terminals, each of which is marked with a small number 1. When the count in the wheel counter 74 is equal to the value of the number on a particular output terminal, that output terminal has a one signal. The wheel counter 74 is reset by the logging signal for the system so that the count in the wheel counter 47 at any one time represents the number of vehicle wheels detected by a wheel sensor after the middle area of a car is detected. The output terminals 2, 4, and 5 of the wheel counter 74 are connected through a trunk line 76 to input terminals of AND gates 78, 80, and 82 at the right hand side of FIGURE 9.

The output terminal 4 is also connected to one input of an AND gate 84 having a second input connected to the "0" terminal of a flip-flop 86. The flip-flop 86 is set by the first logging signal generated (at the middle area of the first car) and remains set until the entire train has been counted. The output terminal 7 of the wheel counter 74 is connected to an AND gate 88 having a second input connected to the "1" terminal of a flip-flop 90. The output terminal 6 of the wheel counter 74 is connected to one input terminal of an AND gate 93 having a second input connected to the "0" terminal 66 of the flip-flop 90. The AND gates 84, 88, and 93 are connected to a common OR gate 94 which in turn drives a single shot 96 connected both to the input terminal of the flip-flop 90 and the input terminal of another flip-flop 92. The other terminal of the flip-flop 92 is tied to an input of an AND gate 98 having a second input connected to the output terminal 66 of the output circuit 64, the output of the AND gate 98 leads to the set terminal of a flop-flop 100 having its "1" terminal connected to a second input of the AND gate 80. The "0" terminal of the flip-flop 92 is connected to an AND gate 110 having a second input from the output terminal 66 of the output circuit 64. The presence of one signals at both input terminals of the AND gate 110 triggers a single shot 112 to produce a clearing pulse which is applied to the clearing terminal 114 of the flip-flop 90.

The AND gates 78, 80, and 82 at the right hand side of the FIGURE 9 are connected to a common OR gate 116 having a single output connected to one of the inputs of an AND gate 118 in FIGURE 8. The other input to the AND gate 118 is provided by a connection to the "0" terminal of a flip-flop 120, the element which causes the inhibition of the regular logging enabling circuit when a car with ten or more sets of wheels is detected. Since the flip-flop 120 is in its reset condition for cars having less than ten sets of wheels, a one signal is generated at the output of the OR gate 116, it is transferred through the AND gate 118 and the OR gate 136 to set an enabling flip-flop 138. When the flip-flop 138 is set, the one signal at its "1" terminal is applied to the enabling input 68 of the output 64, to a car counter 140, and to a single shot 142 which generates a pulse used to reset the flip-flops 92 and 100 in the regular enabling circuit through their clearing terminals 144 and 146, respectively. The flip-flop 138 remains set only until the logging signal generated by the output circuit 64 can be applied to a clearing terminal 130 of the flip-flop 138.

In the description of the operation of the regular enabling circuit, it is assumed that no car in the train has more than eight sets of wheels and that the flip-flop 120 is in its reset condition to inhibit the auxiliary logging enabling circuit and to enable the regular logging enabling circuit. At the beginning of each train, the flip-flop 86 is in a reset condition which results in the application of a one signal to the AND gate 78 and a zero signal to the AND gate 80. On the second wheel of the first car, the AND gate 78 produces a one signal which is transferred through OR gate 116, AND gate 118, and OR gate 136 to the setting terminal of the flip-flop 138 to cause the first car to be counted by the car counter 140 and an enabling signal to be applied to the enabling input 68 of the output circuit 64. When the countdown counter 56 reaches a count of one at any time after the second wheel on the first car in the train, a logging signal is generated by the output circuit 64. The logging signal causes the wheel counter 74 to be reset, the flip-flop 86 to become set, and the flip-flop 138 to be reset.

The description of the operation of the regular enabling circuit with respect to the first car in the train has assumed that the car has no more than six sets of wheels. If the first car has, in fact, eight sets of wheels, the circuit operation is slightly different. Although the flip-flop 138 is set after the second wheel pulse as it was before, the flip-flop 86 remains in its reset condition at least until after the fourth wheel pulse is applied to the AND gate 84. Since the other input of the AND gate 84 is supplied with a one signal from the flip-flop 86, a one signal is generated by the AND gate 84 and is applied to the single shot 96 through OR gate 94 to cause both flip-flops 90 and 92 to be set. The setting of the flip-flop 90 results in a one signal being applied to one input of the AND gate 88 and a zero signal being applied to one input of the AND gate 93. At the same time, the setting of the flip-flop 92 causes a one signal to be applied at one input of the AND gate 98. When the middle area of the first car is detected, the resulting logging signal is applied to the other input of the AND gate 98 to cause that AND gate to set the flip-flop 100, thereby causing a one signal to be applied to the AND gate 82 and a zero signal to be applied to the AND gate 80.

As a result of these changes, no logging enabling signal can be generated until the wheel counter 74 has counted at least five wheels after the middle area of the first car. The reason for requiring the count of 5 is that if a car with eight sets of wheels is followed by a trailer train car of the type shown in FIGURE 6, the unusually long distance between the last wheel set of the first car and the first wheel set of the trailer train car might result in the countdown counter 56 reaching the count of 1 between the cars, thereby causing a false logging signal. This is prevented by inhibiting the establishment of a logging enabling signal until the fifth wheel after the middle area of the first car, which is actually the first wheel of the second car. However, when the fifth wheel is detected, the counters are reset so that the count in the countdown counter 56 is no longer at one. Consequently, no logging signal is generated until the middle area of the second car is reached. When the fifth wheel after the middle area of the first eight wheel-set car is detected, the flip-flop 138 is set, thereby causing a pulse to be generated by the single shot 142 to reset the flip-flops 92 and 100 so as to disable the AND gate 82 and enable the AND gate 80.

Although a count of six accumulates in the wheel counter 74 after the logging signal indicating the middle area of the first car is generated, the sixth pulse has no effect on the logic elements since the flipflop 90 remains set from the time of the fourth wheel pulse to disable the AND gate 93. Where the logging signal for the second car is generated after a wheel count of six has accumulated in the wheel counter 74, the flip-flop 90 is reset by the pulse developed by single shot 112 which is triggered by a simultaneous appearance at the input terminals of AND gate 110 of the logging signal and a one signal from the "0" terminal of the flip-flop 92. All of the flip-flops are then in their reset condition just as they were at the beginning of the train.

After the logging signal is generated at the middle area of the second car, a count of four in the wheel counter 74 causes AND gate 80 to generate a one signal which ultimately causes flip-flop 138 to be set and the flip-flops 92 and 100 to be reset. Unless a count of six is accumulated before the logging signal for the middle area of the third car is generated, flip-flops 90 and 92 remain in their reset condition so that the flip-flop 138 is set on the fourth wheel pulse after the logging signal at the middle area of the third car.

However, if a count of six is accumulated in the wheel counter 74 before the middle area of the third car is detected (indicating that car three has at least eight sets of wheels), AND gate 93 causes a one signal to be generated which triggers flip-flops 90 and 92. The subsequent generation of the logging signal at the middle area of the third car causes flip-flop 100 to be set so that the logging enabling signal for the fourth car cannot be generated until a count of five is accumulated in the wheel counter 74 after the counter is reset at the middle area of the third car. If the fourth car is a conventional four wheel-set car, the circuit responds in the same way as it did when the second car was detected. But if the fourth car has six sets of wheels, the AND gate 88 produces a one signal which causes flip-flop 92 to be set again. The AND gate 98 and the flip-flop 100 are set to cause the logging enabling signal to be generated only upon the fifth wheel pulse after the middle area of the fourth car is detected.

Although the above discussion illustrates how the regular logging enabling circuit operates when vehicles with up to eight sets of wheels are encountered, the bulk of vehicle logging operations are carried out on trains made up of cars having four or six sets of wheels. Where such cars are being logged, the flip-flops 90, 92, and 100 are always in their reset condition so that the flip-flop 138 generates a logging enabling signal at the enabling input 68 of the output circuit 64 on the fourth wheel pulse after the middle area of the preceding car is detected.

Auxiliary logging enabling circuit

While the regular logging enabling circuit described above functions to provide accurate logging enabling signals for virtually all cars now being operated on the American railroads, in rare instances a car having from ten to sixteen sets of wheels may be encountered. When this occurs, the auxiliary enabling circuits in FIGURE 8 including a reversible wheel counter 122 assumes the function of providing logging enabling signals. There are three inputs to the wheel counter 122. The first input 124 is connected directly to the output of the wheel sensor circuit 28. The second input 126 is connected to the "1" terminal of a flip-flop 128 whereas the third input 130 is connected to the "0" terminal of the flip-flop 128. The "0" terminal of the flip-flop 128 is also connected to one input of an AND gate 132, the other input of which is connected to the wheel counter 122. This input to the AND gate 132 is a one signal only when the count in the wheel counter 122 is one. The output of the AND gate 132 is applied to an AND gate 134 having a second input from the one terminal of the flip-flop 120. The AND gates 134 and 118 are connected to the OR gate 136, the other input of which is from the regular enabling circuit. At the beginning of every car, regardless of the number of wheel sets on the car, the flip-flop 128 is in a reset condition and the wheel counter 122 is in its "add" mode of operation. On the count of one while the wheel counter 122 is adding, a one signal is generated by AND gate 132 and is applied to the lower input terminal of AND gate 134. This does not result in the generation of a one signal by AND gate 134, however, unless the flip-flop 120 is set, which occurs only when a wheel count of five or more has accumulated in the wheel counter 122. If the car being logged has less than ten sets of wheels, the flip-flop 120 is reset and a logging signal is generated after an enabling signal is produced by the regular logging enabling circuit. The logging signal sets the flip-flop 128 to cause the wheel counter to begin operating in its "subtract" mode of operation. Since the wheel counter 122 adds from the beginning of each car to the middle and then subtracts, a count of zero indicates that the end of the car has been reached. When the wheel counter 122 has a zero count, a one signal is applied to the clearing terminal 129 of the flip-flop 128 to reset that flip-flop and to cause the wheel counter 122 to begin adding again.

Although the process of adding and subtracting in the wheel counter 122 occurs for every car, the auxiliary logging enabling circuit is isolated from the flip-flop 138 unless a count of five accumulates in the wheel counter 122 before the middle area of a car. When a count of five or more accumulates, the simultaneous occurrence of the one signal from "1" terminal of the flip-flop 120 and the one signal from the AND gate 132 result in the application of a setting pulse to the flip-flop 138 through AND gate 134 and OR gate 136. At the same time, the OR gate 116 in the regular logging enabling circuit is isolated from flip-flop 138 by the inhibiting of the AND gate 118. If a car with ten or more sets of wheels is followed by a car with a fewer number of wheel-sets, the regular enabling circuitry will function in the same manner as it did when an eight wheel-set car was followed by a three wheel-set car.

Determination circuits

Each logging signal generated by the output circuit 64 causes a flip-flop 150 in the determination circuit to be set. When the flip-flop 150 is set, one signals are applied to input terminals on the AND gates 106 and 108. If an identification device has already been read by a circuit 154, a flip-flop 152 will have been set to apply a one signal to AND gate 106 and a zero signal to AND gate 108. Conversely, if no identification device has been read, the flip-flop 152 will be reset so that a zero signal is applied to AND gate 106 and a one signal to AND gate 108. When the wheel counter 74 has counted three wheel pulses subsequent to the logging signal, a one signal is developed by a determination-enabling OR gate 104 and is applied to input terminals of the AND gates 106 and 108. If an identification device was read by the circuit 154, all of the inputs of the AND gate 106 are at one and a one signal is generated at the output of the AND gate. Since the car has already been counted and logged by the circuit 154, this one signal is used only to reset the flip-flops 150 and 152 through an OR gate 158 and a single shot 156. However, if the car being logged lacks an identification device, the flip-flop 152 remains reset. Three wheel pulses after the logging signal, a one signal appears at the output of the AND gate 108 and a signal is transmitted to data logging circuitry asking that an unidentified car be logged. The AND gate 108 is connected to the OR gate 158, the output of which resets the flip-flop 150 and 152 after each determination of whether the car carried an identification device has been made.

If the last car in the train is a conventional four wheel-set car, only two sets of wheels are detected after its middle area. To allow a determination of whether the last car carried an identification device, a time delay element 102 connected to output terminal 2 of wheel counter 74 produces a one signal if two wheel pulses are counted after a logging signal and 10 seconds more elapse. The one signal from element 102 is applied to the OR gate 104 which supplies the same signal to the AND gates 106 and 108 that it would if the normal three pulses were applied to the OR gate 104.

Since the determination of whether a car carried an identification device always occurs on the third wheel pulse after the middle area of the car has been detected, it is necessary that any identification device be located between the first and second or the second and third sets of wheels from the middle area of the car. While the determination could be made on the second wheel pulse after the middle area of a car so long as the identification devices are mounted between the first and second wheel-sets from the middle area, it could not be made on the fourth wheel count after the middle area of the first of these cars does not occur until the innermost wheel of the leading truck of the second car. Since the first car could lack an identification device while the second car had one located at its leading truck, and determination made on the fourth wheel count would pick up the identification device on the second car and would erroneously indicate that the first car had an identification device.

System resetting circuits

The wheel sensor circuit 28 also provides wheel pulses to a shutdown circuit 164, a time delay circuit which does not produce an output signal unless no input is received for a period exceeding 30 seconds. If 30 seconds has gone by without any input pulses having been received, this is an indication that the train has passed completely by the sensor. When this occurs, a one signal generated by the shutdown circuit 164 is applied to an OR gate 166 to reset all counters and memory units. The OR gate 166 has a second input from a track selection circuit including a multi-position switch 168. Each time the position of the switch is changed, a one signal is applied to an OR circuit 170 to cause a signal to be generated by a single shot 172 having its output connected to the input of the OR gate 166. A third input to the OR gate 166 is supplied from power loss reset circuitry which provides a one signal after power, once having been lost, is restored.

Signal sequence chart

Figure 10:
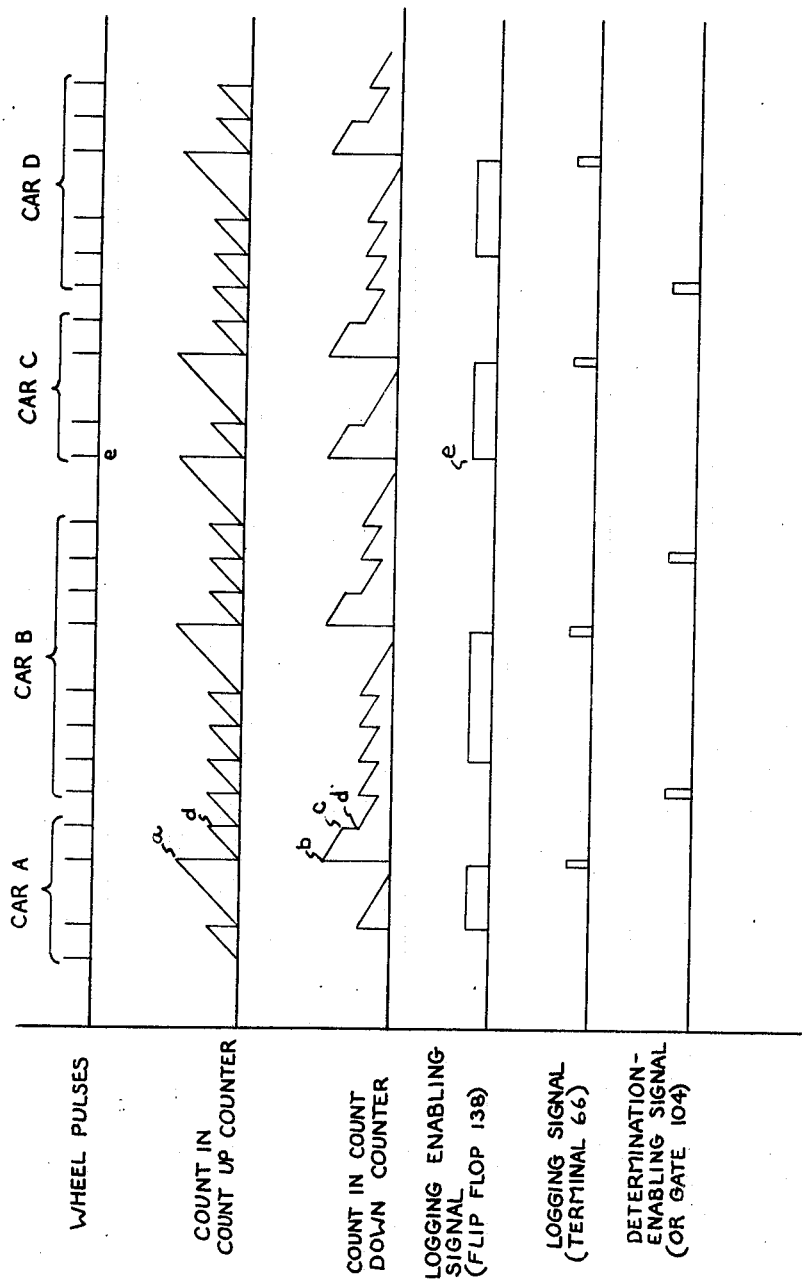
FIGURE 10 is a signal sequence chart showing the time relation of the more significant signals generated in a vehicle logging system constructed in accordance with the present invention.

The operation of the circuit as described may be clarified by reference to the signal sequence chart set out in FIGURE 10. The functioning of the countup counter 54, the countdown counter 56, and the flip-flop 138, the output circuit 64 with its output terminal 66, and the determination-enabling OR gate 104 are shown there during the logging of four railroad cars (A, B, C, D) in a train. As each wheel of each car passes by a wheel sensor (not shown), the countdown counter 56 is set to its minimum count, the count in the countup counter 54 is transferred to the countdown counter 56, and the countup counter 54 is set to zero. This may be graphically seen at the first and second wheels after the middle of car A. While the middle area of car A is passing the wheel sensor, a large count ($a$) builds up in the countup counter 54 at the rate of 1000 pulses per second due to the wide spacing of the wheels and is transferred to the countdown counter 56($b$) at the first wheel after the middle of the car. In the interval between the first and second wheels after the middle of car A, the countdown counter 56 counts from the magnitude ($b$) down to a magnitude ($c$) at the rate of 667 pulses per second. At the second wheel after the middle area, the count ($d$) established in the countup counter 54 is transferred to the countdown counter 56 so that the count in that counter falls instantaneously from ($c$) to ($d'$).

If car A is preceded by a car having less than 8 sets of wheels, the flip-flop 138 is set on the second wheel of car A to permit a logging signal to be generated when the count in the countdown counter 56 reaches its minimum value of one. The logging signal for car A is generated just before the third wheel of that car since this is the first point at which the logging enabling signal established by the setting of the flip-flop 138 and the count of one in the countdown counter 56 exist simultaneously. Three wheels later (on the first wheel of car B) a determination-enabling signal is generated by OR gate 104 to determine if car A carried an identification device. If not, a request is made of data logging circuitry that an unidentified car be logged.

As was brought out above, the logging enabling signal is generated on the fourth wheel-set after the middle area of a car unless the regular logging enabling circuit counted at least six wheel-sets before the middle of that car was found. When the last two wheel-sets in car A and the first four wheel-sets in car B are counted, a count of six is registered by the regular logging enabling circuit which acts to inhibit the generation of a logging enabling signal until the fifth wheel ($e$) after the middle of car B. As may be seen, the wheel ($e$) is actually the first wheel of car C. Although the countdown counter 56 has a minimum magnitude between car B and car C, no logging signal can be generated by the output circuit 64.

DETAILED LOGIC DIAGRAMS

The detailed description of the functional diagram revealed in FIGURES 8 and 9 is intended to illustrate the basic functional operation of a vehicle logging system constructed in accordance with the present invention. A better understanding of how such a system can be constructed with known logic elements may be gained from the following detailed description as applied to FIGURES 11–15. No attempt has been made to orient all of the logic elements in the same relative positions they had in FIGURES 8 and 9. Where the logical construction of certain parts of the system has been described fully with reference to FIGURES 8 and 9, that description is not repeated here.

Pulse counter circuits

Figure 11:
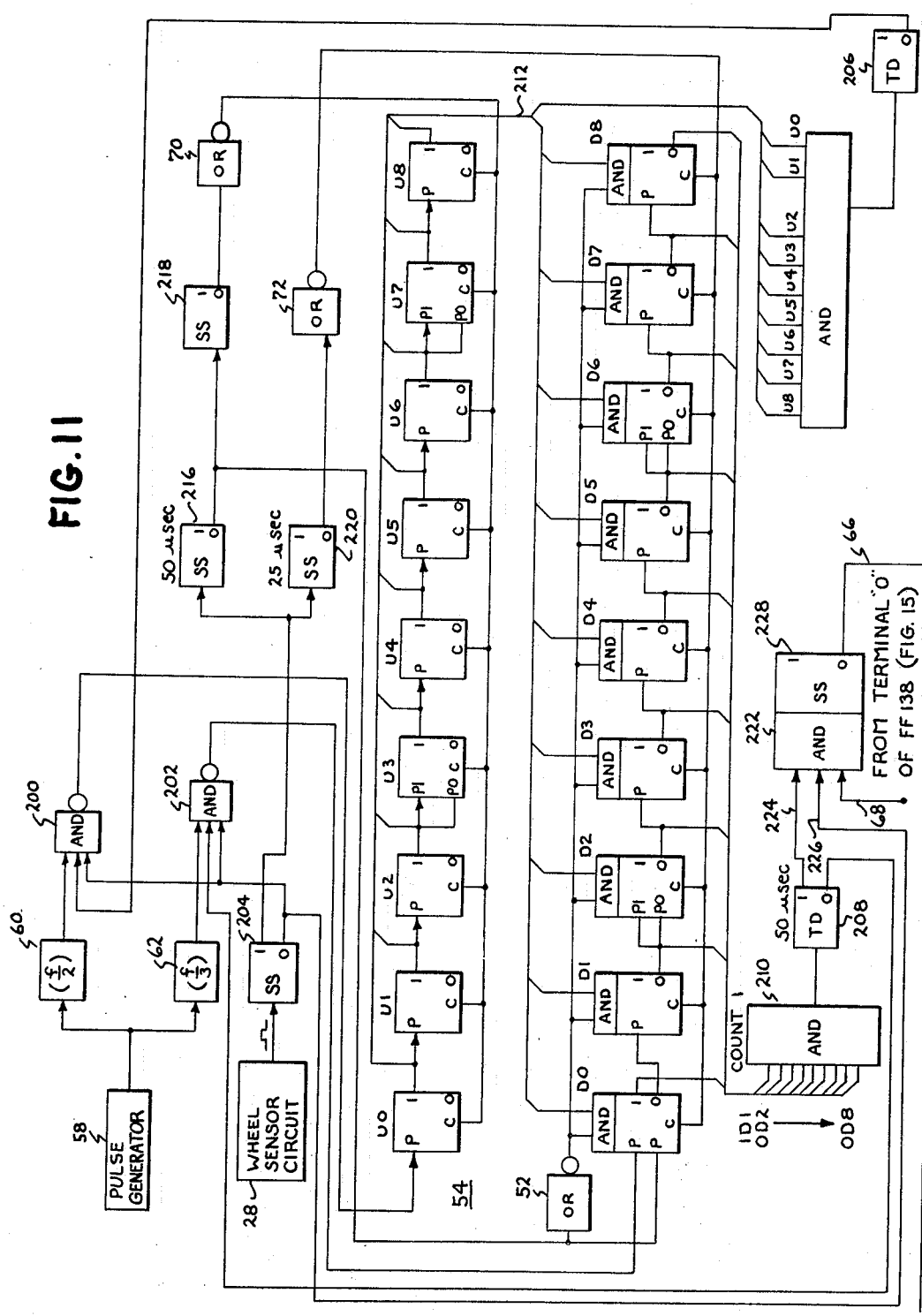

With reference to the pulse generator 58 and the frequency dividers 60 and 62 shown in FIGURE 11, it will be seen that these frequency dividers provide inputs for AND-INV gates 200 and 202, respectively. A second input for the AND-INV gates 200 and 202 is provided by the "0" terminal of a single shot 204 connected to the output of the wheel sensor circuit 28. The signal on the "0" terminal of single shot 204 is normally at a one signal level. However, when a wheel pulse is generated by the wheel sensor circuit 28, the signal on the "0" terminal drops to zero while the output of the "1" terminal goes to one for a predetermined interval. A third input to the AND-INV gate 200 is provided from the "0" terminal of a time delay element 206 which provides a one signal at all times except when the countup counter 54 is at its maximum value. A third input for the AND-INV gate 202 is taken from the "0" terminal of a time delay element 208 which is at a one signal level unless a count of one was detected in the countdown counter 56 by an AND gate 210 more than 50 microseconds before. The AND-INV gate 202 permits transmission of pulses from the frequency divider 60 to the countup counter 54 at all times except when the countup counter 54 is at its maximum value or when a pulse has been generated by the single shot 204 in response to a sensed wheel. At these times, the pulse generator 58 and the frequency divider 60 are isolated from the countup counter 54. Similarly, the AND-INV gate 202 isolates the pulse generator 58 and the frequency divider 62 from the countdown counter 56 when a pulse is generated by the single shot 204 or when a count of one was detected by AND gate 210 more than 50 microseconds before.

The countup counter 54 comprises a series of nine binary counter elements U0–U8 have their "1" terminal outputs connected directly to the pulse input of the adjacent counter element in a conventional manner. The count in the countup counter 54 builds up from left to right as pulses are applied through AND-INV gate 200 to the pulse terminal of counter U0. The mechanics of the counting process and the condition of each counter element at a particular count are well known and are not described here. The countdown counter 56 is also made up of a series of nine binary counter elements D0–D8. To allow the counter 56 to count down, the "0" terminal of each counter element is connected to the pulse terminal of the adjacent element in a conventional manner. The actual counting process and the condition of the counting elements at a particular count during the counting down are also well known and are not described. The number of counting elements in either counter 54 or counter 56 is a function of the pulse rate and the minimum speed at which the train is to operate since the counter 54 should preferably be reset by each wheel pulse before it is filed. Where a countup pulse rate of 1000 pulses per second is adopted, the minimum speed at which the vehicle logging system can effectively operate is about 3 miles per hour. By locating the wheel sensors away from any switching yards, it is assured that trains passing by the wheel sensor will be traveling at speeds above 3 miles per hour.

The "1" terminals of each of the counter elements U0–U8 are connected through a trunkline 212 to one input of each of nine gates associated with the counter element D0–D8, respectively. The other input for each of these AND gates is provided by an OR–INV gate 52, which is the count transfer element shown in FIGURE 8. When the OR–INV gate 52 applies a one signal to each of the AND gates associated with the counter elements D0–D8, each of the counter elements automatically assumes the same condition as its corresponding counter element U0–U8. The trunkline 212 also connects the "1" terminal of the counter elements U0–U8 to an AND gate 214 which generates a one signal when countup counter 54 is at its maximum count so as to cause a time delay element 206 to generate a signal for isolating the pulse generator 58 from the countup counter 54. The "0" terminal of each of the counter elements D1–D8 and the "1" terminal of counter element D0 are connected to the AND gate 210. Since the counter element D0 receives pulses both from the pulse generator 58 through frequency divider 62 and from the wheel sensor circuit 28 through a single shot 216, a count of one is normal in this element.

The single shot 216 is one part of the sequencing circuit 50, which also includes a single shot 216 and its "1" terminal connected to an OR–INV gate 70. The output of the OR–INV gate 70 leads to the clearing terminals of the binary counter elements U0–U8. The sequencing circuit 50 also includes a single shot 220 which develops a 25 microsecond pulse each time it is triggered by the wheel sensor circuit 28 through the single shot 204. The "0" terminal of the single shot 220 is connected to the OR–INV gate 72 having its output connected to the clearing terminals of counter elements D0–D8 in the countdown counter 56.

The sequencing circuit 50 operates in the following manner. Each time a pulse is generated by the wheel sensor circuit 28, the single shot 204 produces a pulse at its "1" terminal that is applied to single shots 216 and 220. The "0" terminal on the single shot 220 produces a 25 microsecond zero signal which is inverted by the OR–INV gate 72 and is applied to the clearing terminals of the elements to clear these elements of their previous count. The single shot 216 develops a 50 microsecond zero signal at its "0" terminal at the same time. When this zero signal is applied to the OR–INV gate 52, the gate 52 causes one signals to be applied to the inputs of the AND gates associated with the counter elements D0–D8. The count in the countup counter 54 is transferred to the previously cleared elements D0–D8 in the 25 microsecond period following the return of the single shot 220 to its normal state, during which time the single shot 216 returns to its normal state. At the end of the 50 microsecond period, the single shot 218 is triggered and the signal on its "0" terminal falls to zero. The OR–INV gate 70 inverts this zero signal and applies the resulting one signal to the clearing terminals of the elements U0–U8 to reset the countup counter 54.

At the bottom of FIGURE 11, the elements making up the output circuit 64 are shown. These elements include an AND gate 222 having a first input 224 from the "1" terminal of the time delay element 208, a second input 226 from the "0" terminal of the single shot 204, and a third enabling input 68 from the logging enabling circuits, shown in detail in FIGURES 12–15. If a count of one was detected by the AND gate 210 more than 50 microseconds earlier, if a wheel pulse has not triggered the single shot 204, and if a logging enabling signal has been generated either by the regular or by the auxiliary logging enabling circuits, the AND gate 222 produces a one signal output which triggers the single shot 228 and causes the signal on its output terminal 66 to fall to a zero level. The circuit operation which takes place on the triggering of the single shot 228 is set forth in the following description of the logical construction of the auxiliary and the regular enabling circuits.

Regular logging enabling circuit

Figure 14:
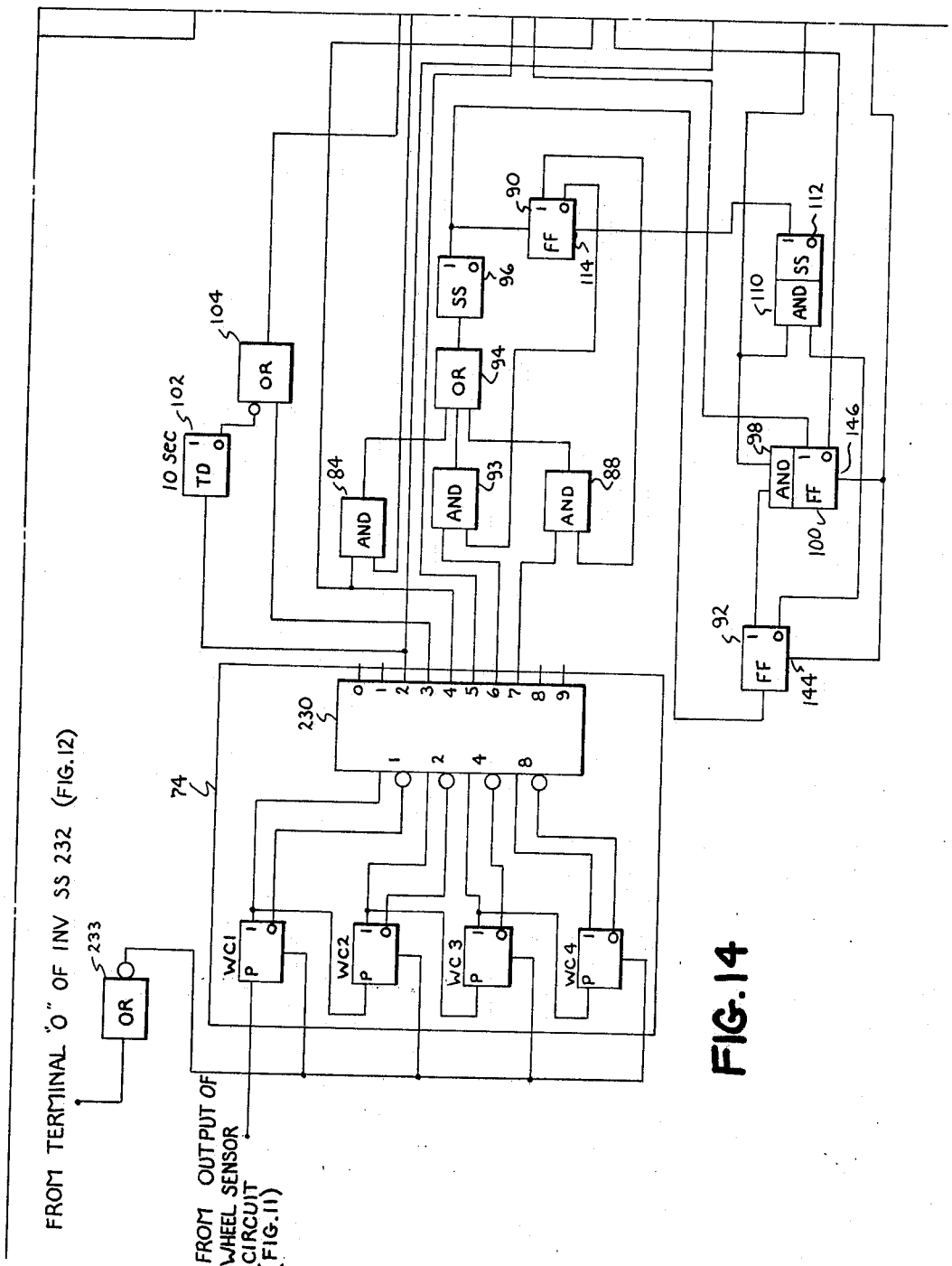

The regular logging enabling circuit is shown primarily in FIGURES 14 and 15 and includes the same logic elements described in connection with FIGURES 8 and 9. In the functional description, the wheel counter 74 was represented merely by a binary-to-decimal converter. Although the logic circuit still includes a binary-to-decimal converter 230, this converter is driven by binary input counters WC1–WC4 rather than by the wheel sensor circuit 28. The "1" terminal of each binary input counter is connected to a regular input on the converter 230 while the "0" terminal of each binary input counter is connected to an inverted input terminal. Each wheel pulse causes the binary input counters WC1–WC4 to count up in conventional fashion and to deliver pulses to the input terminals of the converter 230 which are converted to decimal output signals. The binary input counters WC1–WC4 are reset by each logging signal. Each logging signal causes a zero signal to be applied to an OR–INV gate 233 which produces a one signal that is applied to the clearing terminals of counters WC1–WC4.

The logical construction of the elements connected to the output of the binary-to-decimal converter 230 are described in detail in the functional description of the regular logging enabling circuit. A clear understanding of the logical construction of the enabling circuit from the binary-to-decimal converter 230 through the OR gate 116 may be obtained from the functional description.

Auxiliary logging enabling circuit

Figure 12:
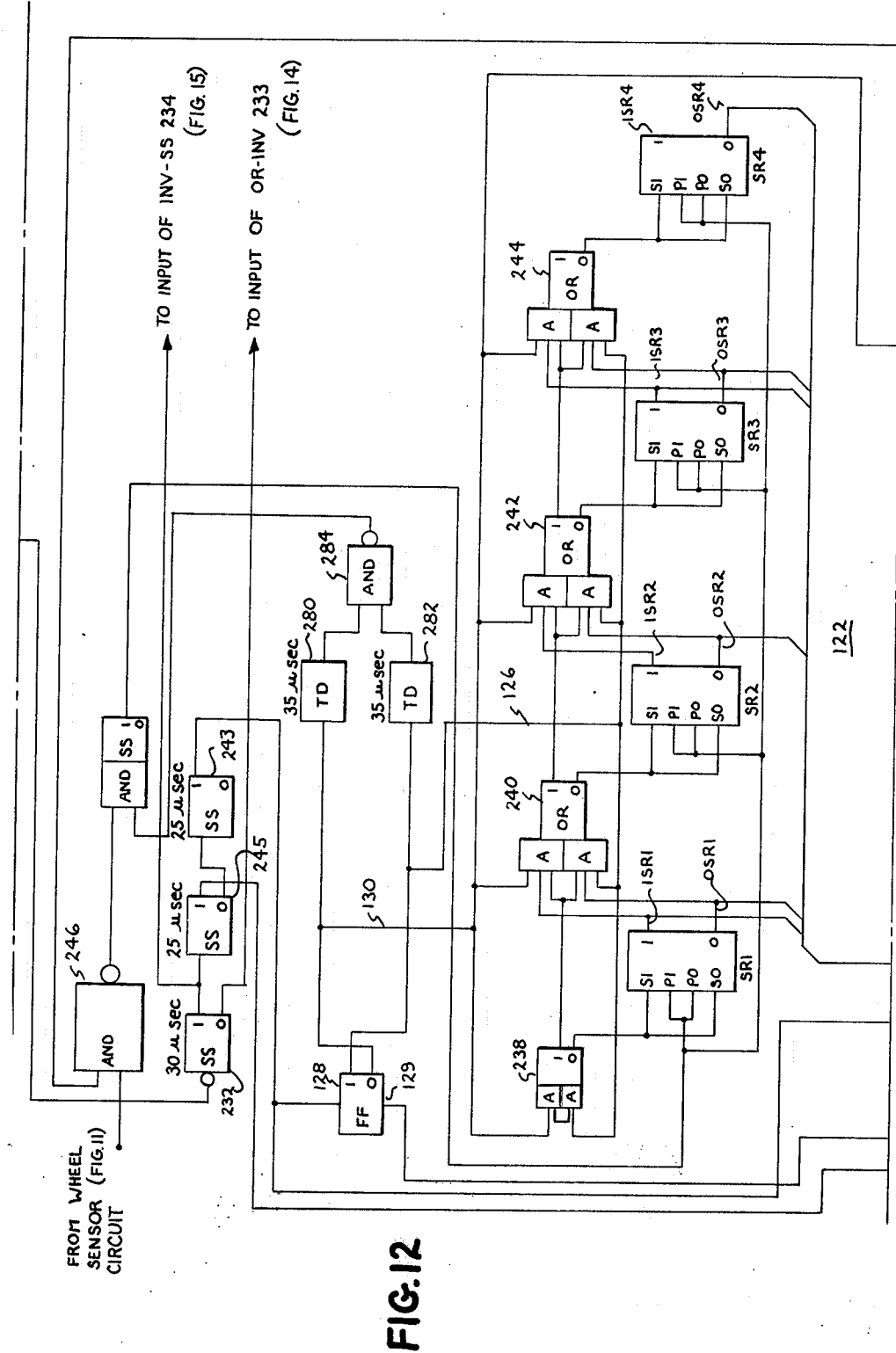
Figure 13:
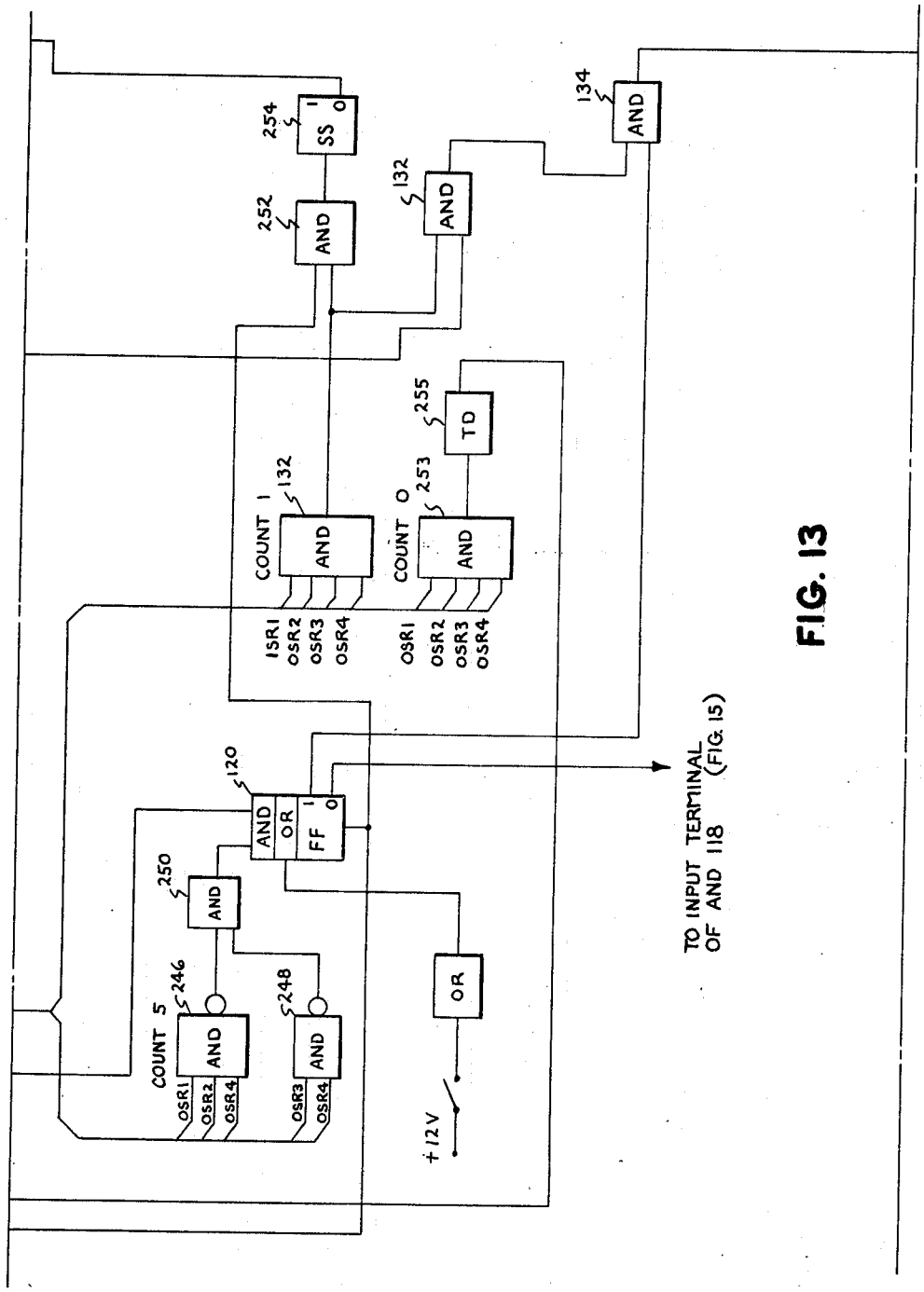

The auxiliary logging enabling circuit is shown in detail in FIGURES 12 and 13. The reversible wheel counter 122 of FIGURE 8 includes a series of shift registers (SR1–SR4) in circuit with the driving elements 238–244. Each of the driving elements includes a pair of AND gates connected to a single OR gate having a normal output at a "1" terminal and an inverted output at a "0" terminal. If either the upper or the lower AND gate has a one output, a one signal appears at the "1" terminal and a zero signal appears at the "0" terminal. If neither AND gate produces a one signal, the "1" terminal has a zero signal and the "0" terminal has a one signal. At the beginning of each car, all of the shift registers are in their reset condition and the signals at the "1" and "0" terminals of the driving elements 240, 242, 244 are zero and one, respectively.

The flip-flop 128 is in a reset state and produces a one signal on lead 130 that is applied to the only input of the upper AND gate of driving element 238 that is not already self supplied with one signals. The output signal of the OR gate "1" terminal of the driving element 238 is a one signal while the output signal of the "0" terminal is a zero signal. With the S1 and S0 terminals of SR1 held at zero, the first wheel pulse causes SR1 to change states as if it were a binary counter, but does not affect the remaining shift registers since their steering terminals are held at one. The setting of SR1 causes the upper AND gate of driving element of 240 to drive the adjacent OR gate to its set condition. SR2 may then be set by the second pulse. The second pulse causes SR1 to be reset and the third pulse causes SR1 to set in a conventional or binary counter fashion. The count in the reversible counter 122 builds up until the middle of the car is detected, at which time flip-flop 128 is set to drive the signal on lead 130 to zero and the signal on lead 126 to one. The wheel pulses following the midle of the car cause the shift registers to count down until a count of zero is reached on the last wheelset of the car. On a count of zero, AND gate 253 produces a one signal which is applied to a time delay element 255. After a predetermined time lapse a one signal is generated and is applied to the clearing terminal 129 for flip-flop 128.

If a count of five or more is established in the shift registers SR1-SR4 before the flip-flop 128 is set at the middle of a car, a one signal is applied to one input of a flip-flop 120 by a gating system including a first AND-INV gate 246 with inputs connected to the "0" terminals of SR1, SR2, and SR4, a second AND-INV gate 248 with inputs connected to the "0" terminals of SR3 and SR4, and an output AND gate 250. If the count is less than five, either the AND-INV gate 246 or the AND-INV gate 248 produces a zero signal which prevents the AND gate 250 from applying a one signal to the input of flip-flop 120. Each logging signal generated by the output circuit 64 causes a single shot 232 to produce a 30 microsecond one signal at its "1" terminal. This signal triggers a single shot 245 which generates a 25 microsecond pulse that is applied to the clearing terminal of the flip-flop 120 to temporarily reset that flip-flop. The return of single-shot 245 to its normal state triggers single shot 243. A 25 microsecond one signal generated by this single shot is applied to the AND gate associated with flip-flop 120. If a count of 5 or more had accumulated in the counter 122, the flip-flop 120 then sets. The next time a logging enabling signal can be generated is on the first wheel of the next car since it is only at this time that the AND gate 132 and the flip-flop 120 have one signals on their terminals connected to the AND gate 134.

On the next car the triggering of single shot 245 by the logging signal again results in the clearing of flip-flop 120. If the counter 122 has not counted at least 5 wheels before the logging signal, the subsequent pulse developed by single shot 243 does not set the flip-flop 120. The regular logging enabling circuit then assumes the function of setting the enabling flip-flop 138 at the proper time.

To allow the capacitor memories in SR1-SR4 to settle the wheel pulse receiving AND-INV gate 246 is inhibited temporarily after the flip-flop 120 changes states. A pair of time delay elements 280 and 282 are connected to the "1" and the "0" terminals of flip-flop 120. When the flip-flop 120 is in the process of changing states one signals are applied temporarily to both time delay elements. After 35 microseconds, the outputs of both elements go to a one signal level. When this occurs, the output of an AND-INV gate 284 connected to the output of the time delay elements falls to zero to inhibit the AND-INV gate 246 for a predetermined time.

The auxiliary logging enabling circuit is self correcting to a certain extent. If the count of one is seen at the same time the middle of a car is detected, one signals appear simultaneously on the inputs of AND gate 252 to cause the triggering of a single shot 254. The single shot 254 causes the AND-INV gate 246 to generate a false pulse to increase the count in the reversible counter to two, the correct count at the middle of a common four wheel-set car.

Determination circuitry

The determination circuit elements in FIGURE 15 are similar to those shown in the functional diagram in FIGURE 8. When the level of signal at the output terminal 66 of single shot 228 in FIGURE 11 falls to zero, the single shot 232 is triggered to provide a one signal at its "1" terminal. This one signal is applied to an inverted single shot 234. After 30 microseconds, the one signal goes to zero and the single shot 234 is triggered to set flip-flop 150. Three wheel pulses after the logging signal, either AND gate 106 or AND gate 108 will have all of its inputs at the one signal level. If the car carried an identification device, the output of the AND gate 106 causes OR gate 158 to trigger a single shot 156. The signal on the "0" terminal of this single shot is inverted and applied to OR-INV gate 158 to cause the flip-flops 150 and 152 to be reset. The determination circuitry is then completely reset and is in a condition which will permit it to determine whether the succeeding car in the train is carrying an identification device.

Although the system described above constitutes a preferred embodiment of the invention, it is obvious that many modifications and variations therein will occur to those skilled in the art. Therefore, it is intended that the appended claims shall cover all such variations and modifications as fall within the true spirit and scope of the invention.

What I claim is:

1. A vehicle logging system for use with a wheel sensor producing an electrical signal whenever a vehicle wheel passes by the sensor, said logging circuit including:
   (a) a first counter;
   (b) a second counter;
   (c) a first pulse circuit connected to said first counter for establishing a count at a predetermined first rate in said first counter during the intervals between electrical signals;
   (d) a sequencing circuit responsive to each of the electrical signals to sequentially reset said second counter, transfer the count in said first counter to said second counter, and reset said first counter;
   (e) a second pulse circuit connected to said second counter for reducing the magnitude of the count in said second counter at a second rate during the intervals between electrical signals, the second rate being less than the first rate;
   (f) logging enabling circuit means connected to the wheel sensor for producing an enabling signal upon the occurrence of a predetermined number of electrical signals; and
   (g) an output circuit connected to said logging enabling circuit and to said counter for generating a vehicle logging signal upon the simultaneous occurrence of an enabling signal and of a predetermined minimum count in said second counter.

2. A vehicle logging system as recited in claim 1 further including:
   (a) a first gating means interposed between said first pulse circuit and said first counter;

(b) a second gating means interposed between said second pulse circuit and said second counter;

(c) means for producing a temporary inhibiting signal in response to an electrical signal;

(d) a first connector means for applying the temporary inhibiting signal to said first gating means and to said second gating means to isolate said first and said second pulse circuits from said first and said second counters.

3. A vehicle logging system as recited in claim 1 wherein said sequencing circuit includes:

(a) a first device for producing a first signal having an established duration;

(b) a second device for producing a second signal having an established duration greater than the duration of the first signal;

(c) a third device connected to said second device for producing a signal upon the lapse of the second signal;

(d) a third gating means for inhibiting the transfer of counts from said first counter to said second counter;

(e) means responsive to each electrical signal for triggering said first device and said second device;

(f) means for applying the first signal to said second counter to reset that counter;

(g) means for applying the second signal to the third gating means to eliminate the inhibiting of the count transfer; and (h) means for applying the third signal to said first counter to reset that counter.

4. A vehicle logging system as recited in claim 1 wherein the enabling signal produced by said logging enabling circuit means is a function of the number of electrical signals received by said logging enabling circuit means subsequent to the generation of a prior vehicle logging signal.

5. A vehicle logging system as recited in claim 1 in further combination with circuitry for determining if a vehicle being logged carried an identification device and for requesting that an unidentified car be logged if it did not, said circuitry including:

(a) a first gating means;

(b) a second gating means;

(c) a first bistable means responsive to the generation of a logging signal to apply a signal to said first gating means and said second gating means;

(d) a second bistable means responsive to the presence of an identification device on a car being logged to apply a signal to said first gating means and responsive to the lack of an identification device to apply a signal to said second gating means;

(e) a third gating means responsive to a predetermined number of electrical signals after the logging signal for applying a signal to said first gating means and said second gating means, whereby either said first gating means or said second gating means produces an output signal; and (f) means for applying any output signal from said second gating means to circuitry for requesting that an unidentified car be logged.

6. A vehicle logging system as recited in claim 5 wherein said third gating means includes:

(a) a first logic element responsive to the third electrical signal subsequent to the logging signal to apply a signal to said first gating means; and (b) a second logic element responsive upon the lapse of a predetermined time subsequent to a second electrical signal to apply a signal to said first gating means if a third electrical signal is not received during the predetermined time.

7. A vehicle logging system as recited in claim 5 in further combination with:

(a) a fourth gating means connected to the outputs of said first gating means and said second gating means and responsive to a signal produced by either said first gating means or said second gating to produce an output signal; and (b) means for applying the output signal to said first and said second bistable means to cause them to assume a reset condition.

8. A vehicle logging system as recited in claim 1 wherein said logging enabling circuit means includes:

(a) a regular logging enabling circuit for generating logging enabling signals;

(b) an auxiliary logging enabling circuit for generating logging enabling signals; and (c) a first bistable device for inhibiting the auxiliary logging enabling circuit if the car for which the previous logging enabling signal was generated had less than a predetermined number of wheel-sets and for inhibiting the regular logging enabling circuit if that car had a number of wheel-sets equal to or greater than the predetermined number.

9. A vehicle logging system as recited in claim 8 wherein said regular logging enabling circuit includes:

(a) a counting means for accumulating electrical signals produced between successive logging signals; and (b) a gating system responsive to the accumulation of a predetermined number of electrical signals produced between first and second logging signals to produce a logging enabling signal upon the accumulation of a set number of electrical signals after the second logging signal.

10. A vehicle logging system as recited in claim 9 wherein said gating system in said regular logging enabling circuit further includes:

(a) a first gating means normally responsive to the accumulation of a first number of electrical signals produced between first and second logging signals to permit the generation of a logging enabling signal upon the accumulation of a set number of electrical signals subsequent to the second logging signal; and (b) a second gating means responsive to the accumulation of a second number of electrical signals greater than the first number to inhibit said first gating means and to permit the generation of a logging enabling signal only upon the accumulation of a number of electrical signals greater than the set number subsequent to the second logging signal.

11. A vehicle logging system as recited in claim 10 in further combination with:

(a) a third gating means responsive to the accumulation of a third number of logging signals to permit the generation of a logging enabling signal; and (b) a second bistable device having an input connected to said output circuit, a first output connected to said first gating means, and a second output connected to said third gating means, said second bistable device being prior to the generation of a first logging signal in a reset condition wherein an inhibiting signal is applied through said first output to said first gating means and an enabling signal is applied through said second output to said third gating means, but being driven by the first logging signal into a set condition wherein an enabling signal is applied to said first gating means and an inhibiting signal is applied to said third gating means.

12. A vehicle logging system as recited in claim 11 wherein said auxiliary logging enabling circuit includes:

(a) a reversible counter for counting electrical signals and having add and subtract modes of operation;

(b) a third bistable device for generating a first signal to cause said reversible counter to operate in its add mode or a second signal to cause said reversible counter to operate in its subtract mode;

(c) means for applying the logging signal to said third bistable device to cause it to generate the first signal;

(d) means responsive to a count of zero in said reversible counter to cause said third bistable device to generate the second signal; and (e) means responsive to a count of a predetermined magnitude in said reversible counter to cause said first bistable device to inhibit the regular logging enabling circuit.

References Cited

UNITED STATES PATENTS 3,417,231   12/1968   Stites et al. _____ 235—92 X

MAYNARD R. WILBUR, Primary Examiner

MICHAEL K. WOLENSKY, Assistant Examiner

U.S. Cl. X.R.

235—61.11; 340—47